(12) United States Patent
Fisher

(10) Patent No.: US 10,248,938 B2
(45) Date of Patent: Apr. 2, 2019

(54) REMOTE TRANSACTION PROCESSING AT A SERVER WITH AUTHENTICATION AFTER A PRODUCT LIST

(71) Applicant: Michelle T Fisher, Oakland, CA (US)

(72) Inventor: Michelle T Fisher, Oakland, CA (US)

(73) Assignee: Michelle Fisher, Berkeley, CA (US)

( * ) Notice: Subject to any disclaimer, the term of this patent is extended or adjusted under 35 U.S.C. 154(b) by 57 days.

(21) Appl. No.: 14/083,703

(22) Filed: Nov. 19, 2013

(65) Prior Publication Data

US 2015/0142542 A1 May 21, 2015

(51) Int. Cl.
*G06Q 20/20* (2012.01)
*G06Q 40/00* (2012.01)
*H04W 4/21* (2018.01)
*G06Q 20/32* (2012.01)
*G06Q 30/02* (2012.01)
(Continued)

(52) U.S. Cl.
CPC .............. *G06Q 20/20* (2013.01); *G06Q 20/00* (2013.01); *G06Q 20/108* (2013.01); *G06Q 20/16* (2013.01); *G06Q 20/202* (2013.01); *G06Q 20/204* (2013.01); *G06Q 20/206* (2013.01); *G06Q 20/32* (2013.01); *G06Q 20/322* (2013.01); *G06Q 20/325* (2013.01); *G06Q 20/3223* (2013.01); *G06Q 20/3226* (2013.01); *G06Q 20/3227* (2013.01); *G06Q 20/3255* (2013.01); *G06Q 20/3278* (2013.01); *G06Q 20/3674* (2013.01); *G06Q 20/382* (2013.01); *G06Q 20/3821* (2013.01); *G06Q 20/40* (2013.01);
(Continued)

(58) Field of Classification Search
CPC ........ G06Q 20/00; G06Q 20/10; G06Q 20/20; G06Q 20/40; G06Q 20/102–20/105; G06Q 20/206; G06Q 30/207; G06Q 40/10; G06Q 20/108; G06Q 20/32; G06Q 10/063; G06Q 10/087; G06Q 20/208; G06Q 30/00–30/06; G06Q 20/04; G06Q 10/10; G01S 1/00–1/08; H04L 29/06; H04L 67/28; H04L 63/10; G06F 21/00; G06F 21/41; G06F 17/16; H04N 7/14
USPC .... 705/7, 14.1, 16, 18, 30, 35, 26.7, 40, 41, 705/44, 70, 7.29, 23, 14.23, 14.37, 14.51, 705/14.52, 14.64, 26, 39, 65; 455/406, 455/407, 411, 414.1; 348/14.03; 380/201
See application file for complete search history.

(56) References Cited

U.S. PATENT DOCUMENTS 5,852,775 A * 12/1998 Hidary ................ H04L 12/1859
455/412.1
5,887,266 A * 3/1999 Heinonen ............... G06Q 20/04
455/406
(Continued)

FOREIGN PATENT DOCUMENTS

WO    WO 2006095212 A1 *  9/2006  ............ H04M 11/00
WO    WO 2006095212 A1     9/2006

OTHER PUBLICATIONS

U.S. Appl. No. 11/933,337, Office Action dated May 27, 2010, 9 p.
(Continued)

*Primary Examiner* — Olusegun Goyea

(57) ABSTRACT

A method and system for conducting an online payment transaction through a mobile device. The method includes receiving input from a user selecting an item for purchase through the point of sale device; processing the transaction, and sending a digital artifact to the mobile device.

41 Claims, 4 Drawing Sheets

(51) Int. Cl.

| | |
|---|---|
| *G06Q 30/06* | (2012.01) |
| *G06Q 20/38* | (2012.01) |
| *G06Q 20/40* | (2012.01) |
| *G06Q 20/36* | (2012.01) |
| *G06Q 20/16* | (2012.01) |
| *G06Q 20/00* | (2012.01) |
| *G06Q 20/10* | (2012.01) |
| *H04W 8/20* | (2009.01) |
| *H04M 1/725* | (2006.01) |
| *H04W 4/18* | (2009.01) |
| *H04B 5/00* | (2006.01) |
| *H04W 4/80* | (2018.01) |
| *H04N 21/81* | (2011.01) |
| *G07F 7/10* | (2006.01) |
| *H04W 88/02* | (2009.01) |
| *H04W 4/02* | (2018.01) |

(52) U.S. Cl.
CPC ....... *G06Q 20/409* (2013.01); *G06Q 20/4012* (2013.01); *G06Q 20/4014* (2013.01); *G06Q 30/02* (2013.01); *G06Q 30/0222* (2013.01); *G06Q 30/0238* (2013.01); *G06Q 30/0251* (2013.01); *G06Q 30/0253* (2013.01); *G06Q 30/0255* (2013.01); *G06Q 30/0267* (2013.01); *G06Q 30/0268* (2013.01); *G06Q 30/06* (2013.01); *G06Q 30/0613* (2013.01); *G06Q 30/0635* (2013.01); *G06Q 40/10* (2013.01); *G06Q 40/12* (2013.12); *H04B 5/0025* (2013.01); *H04M 1/72561* (2013.01); *H04W 4/18* (2013.01); *H04W 4/21* (2018.02); *H04W 8/205* (2013.01); *G06Q 20/10* (2013.01); *G06Q 20/105* (2013.01); *G06Q 40/00* (2013.01); *G07F 7/1008* (2013.01); *H04N 21/812* (2013.01); *H04W 4/02* (2013.01); *H04W 4/80* (2018.02); *H04W 88/02* (2013.01)

(56) References Cited

U.S. PATENT DOCUMENTS

| | | | | |
|---|---|---|---|---|
| 5,915,243 | A * | 6/1999 | Smolen | G06Q 30/02 379/92.01 |
| 6,036,086 | A * | 3/2000 | Sizer, II | G06Q 20/32 235/375 |
| 6,038,367 | A | 3/2000 | Abecassis | |
| 6,075,971 | A * | 6/2000 | Williams | H04N 21/25891 348/E7.063 |
| 6,101,483 | A * | 8/2000 | Petrovich | G06Q 20/202 705/21 |
| 6,115,601 | A * | 9/2000 | Ferreira | H04M 15/47 379/114.2 |
| 6,123,259 | A * | 9/2000 | Ogasawara | G06K 17/0022 235/380 |
| 6,128,655 | A | 10/2000 | Fields | |
| 6,141,666 | A | 10/2000 | Tobin | |
| 6,199,082 | B1 | 3/2001 | Ferrel | |
| 6,243,447 | B1 * | 6/2001 | Swartz | G06K 7/0008 379/110.01 |
| 6,250,557 | B1 * | 6/2001 | Forslund | G06K 17/0022 235/375 |
| 6,305,603 | B1 * | 10/2001 | Grunbok, Jr. | G06Q 20/02 235/379 |
| 6,334,109 | B1 * | 12/2001 | Kanevsky | G06Q 30/02 705/14.67 |
| 6,394,341 | B1 * | 5/2002 | Makipaa | G06Q 20/02 235/379 |
| 6,415,156 | B1 | 7/2002 | Stadelmann | |
| 6,450,407 | B1 * | 9/2002 | Freeman | G06K 19/0723 235/376 |
| 6,487,540 | B1 * | 11/2002 | Smith | G06Q 20/02 705/21 |
| 6,535,132 | B2 * | 3/2003 | Waters | G09F 3/00 235/383 |
| 6,587,835 | B1 * | 7/2003 | Treyz | G06Q 20/12 705/14.64 |
| 6,605,120 | B1 | 8/2003 | Fields | |
| 6,647,257 | B2 * | 11/2003 | Owensby | H04M 3/42348 455/414.1 |
| 6,771,981 | B1 | 8/2004 | Zalewski | |
| 6,772,396 | B1 | 8/2004 | Cronin | |
| 6,775,539 | B2 * | 8/2004 | Deshpande | G06Q 30/02 455/414.4 |
| 6,886,017 | B1 | 4/2005 | Jackson | |
| 6,950,939 | B2 | 9/2005 | Tobin | |
| 6,975,856 | B2 * | 12/2005 | Ogasawara | G06Q 20/108 455/411 |
| 7,031,945 | B1 | 4/2006 | Donner | |
| 7,069,248 | B2 | 6/2006 | Huber | |
| 7,072,861 | B1 * | 7/2006 | Yamanaka | G06Q 20/04 705/17 |
| 7,092,905 | B2 * | 8/2006 | Behrenbrinker | G06Q 20/04 705/35 |
| 7,096,003 | B2 | 8/2006 | Joao | |
| 7,110,744 | B2 | 9/2006 | Freeny | |
| 7,110,792 | B2 * | 9/2006 | Rosenberg | G06Q 20/085 235/380 |
| 7,127,236 | B2 | 10/2006 | Khan | |
| 7,200,578 | B2 * | 4/2007 | Paltenghe | G06F 21/6209 705/1.1 |
| 7,289,810 | B2 | 10/2007 | Jagadeesan | |
| 7,308,254 | B1 | 12/2007 | Rissanen | |
| 7,357,312 | B2 | 4/2008 | Gangi | |
| 7,374,082 | B2 * | 5/2008 | Van de Velde et al. | 235/380 |
| 7,379,920 | B2 | 5/2008 | Leung | |
| 7,383,226 | B2 * | 6/2008 | Kight | G06Q 20/04 705/40 |
| 7,472,829 | B2 | 1/2009 | Brown | |
| 7,482,925 | B2 | 1/2009 | Hammad | |
| 7,487,912 | B2 * | 2/2009 | Seifert | G06Q 20/0453 235/380 |
| 7,512,567 | B2 * | 3/2009 | Bemmel | G06Q 20/20 705/64 |
| 7,522,905 | B2 | 4/2009 | Hammad | |
| 7,555,284 | B2 * | 6/2009 | Yan | G06Q 20/045 455/411 |
| 7,681,788 | B2 * | 3/2010 | Van de Velde et al. | 235/380 |
| 7,725,369 | B2 * | 5/2010 | Shiftan | G06Q 10/087 705/24 |
| 7,783,532 | B2 * | 8/2010 | Hsu | G06Q 10/087 705/14.11 |
| 7,784,684 | B2 * | 8/2010 | Labrou | G06Q 20/32 235/375 |
| 7,818,284 | B1 * | 10/2010 | Walker | G06Q 20/387 705/26.2 |
| 7,827,056 | B2 * | 11/2010 | Walker | G06Q 10/101 705/14.1 |
| 7,870,077 | B2 * | 1/2011 | Woo | G06Q 20/02 235/379 |
| 7,979,519 | B2 * | 7/2011 | Shigeta | H04L 67/2823 370/349 |
| 8,005,426 | B2 * | 8/2011 | Huomo | G06Q 20/20 235/441 |
| 8,019,362 | B2 * | 9/2011 | Sweatman | H04W 4/12 455/455 |
| 8,073,424 | B2 * | 12/2011 | Sun | G06Q 20/085 455/406 |
| 8,086,534 | B2 * | 12/2011 | Powell | G06O 20/32 705/44 |
| 8,109,444 | B2 * | 2/2012 | Jain | G06K 19/07739 235/487 |
| 8,121,945 | B2 | 2/2012 | Rackley | |
| 8,127,984 | B2 * | 3/2012 | Zatloukal | G06K 7/0008 235/375 |
| 8,214,454 | B1 * | 7/2012 | Barnes | G06F 17/30876 709/217 |

(56) References Cited

U.S. PATENT DOCUMENTS

| | | | |
|---|---|---|---|
| 8,396,758 B2* | 3/2013 | Paradise | G06Q 30/02 705/26.62 |
| 8,429,030 B2* | 4/2013 | Walker | G06Q 30/02 705/14.38 |
| 8,429,031 B2* | 4/2013 | Walker | G06Q 30/02 705/14.38 |
| 8,429,048 B2* | 4/2013 | Singh | G06Q 20/20 705/35 |
| 8,438,077 B2* | 5/2013 | Walker | G06Q 30/02 705/14.38 |
| 8,438,078 B2* | 5/2013 | Walker | G06Q 30/02 705/14.38 |
| 8,467,766 B2* | 6/2013 | Rackley, III | G06Q 20/042 455/406 |
| 8,489,067 B2* | 7/2013 | Rackley, III | G06Q 20/102 455/406 |
| 8,510,220 B2* | 8/2013 | Rackley, III | G06Q 20/102 705/39 |
| 2001/0011250 A1* | 8/2001 | Paltenghe | G06F 21/6209 705/41 |
| 2001/0018660 A1* | 8/2001 | Sehr | G06Q 10/02 705/5 |
| 2001/0044751 A1* | 11/2001 | Pugliese, III | G06Q 30/02 705/14.1 |
| 2001/0044900 A1* | 11/2001 | Uchida | G06F 21/32 713/186 |
| 2001/0049636 A1* | 12/2001 | Hudda | G06Q 30/06 705/26.1 |
| 2002/0026423 A1* | 2/2002 | Maritzen | G06Q 20/02 705/56 |
| 2002/0046090 A1* | 4/2002 | Stewart | G06Q 10/107 705/14.52 |
| 2002/0056091 A1* | 5/2002 | Bala | G06Q 30/02 725/34 |
| 2002/0059100 A1 | 5/2002 | Shore | |
| 2002/0059147 A1* | 5/2002 | Ogasawara | G06Q 20/108 705/70 |
| 2002/0063895 A1 | 5/2002 | Agata | |
| 2002/0065728 A1* | 5/2002 | Ogasawara | G06Q 20/208 705/23 |
| 2002/0065774 A1* | 5/2002 | Young | G06Q 20/02 705/41 |
| 2002/0072931 A1* | 6/2002 | Card | G06Q 20/363 705/1.1 |
| 2002/0077918 A1 | 6/2002 | Lerner | |
| 2002/0082879 A1 | 6/2002 | Miller | |
| 2002/0101993 A1* | 8/2002 | Eskin | G01S 1/68 380/270 |
| 2002/0106081 A1* | 8/2002 | Yang | G06F 21/41 380/201 |
| 2002/0107756 A1 | 8/2002 | Hammons | |
| 2002/0116269 A1* | 8/2002 | Ishida | G06Q 30/02 705/14.64 |
| 2002/0160761 A1* | 10/2002 | Wolfe | H04M 3/493 455/414.1 |
| 2002/0165638 A1* | 11/2002 | Bancroft | A47F 10/00 700/213 |
| 2002/0165790 A1* | 11/2002 | Bancroft | G06Q 10/063 705/7.29 |
| 2002/0169664 A1* | 11/2002 | Walker | B42D 15/00 705/14.36 |
| 2002/0169984 A1 | 11/2002 | Kumar | |
| 2002/0174444 A1* | 11/2002 | Gatto | G06Q 30/06 725/133 |
| 2002/0181710 A1* | 12/2002 | Adam | G06Q 20/02 380/270 |
| 2002/0183046 A1* | 12/2002 | Joyce | G06Q 20/045 455/414.1 |
| 2003/0028426 A1* | 2/2003 | Banerjee | G06Q 30/02 705/14.37 |
| 2003/0028458 A1* | 2/2003 | Gaillard | G06Q 20/04 705/35 |
| 2003/0033272 A1* | 2/2003 | Himmel | G06Q 10/02 |
| 2003/0061113 A1* | 3/2003 | Petrovich | G06Q 10/087 705/26.43 |
| 2003/0065805 A1 | 4/2003 | Barnes | |
| 2003/0066883 A1* | 4/2003 | Yu | G06K 7/1095 235/382 |
| 2003/0074259 A1* | 4/2003 | Slyman, Jr. | G06Q 20/204 705/14.22 |
| 2003/0085286 A1* | 5/2003 | Kelley | G06K 19/073 235/492 |
| 2003/0087601 A1* | 5/2003 | Agam | G06F 21/34 455/39 |
| 2003/0093311 A1* | 5/2003 | Knowlson | G06Q 30/02 705/14.66 |
| 2003/0093695 A1 | 5/2003 | Dutta | |
| 2003/0105641 A1 | 6/2003 | Lewis | |
| 2003/0132298 A1* | 7/2003 | Swartz | G06K 17/00 235/472.02 |
| 2003/0140004 A1 | 7/2003 | O'Leary | |
| 2003/0159040 A1* | 8/2003 | Hashimoto | G06F 21/35 713/168 |
| 2003/0163359 A1* | 8/2003 | Kanesaka | G06Q 30/0204 705/7.33 |
| 2003/0172028 A1 | 9/2003 | Abell | |
| 2003/0225686 A1* | 12/2003 | Mollett | G06Q 20/00 705/38 |
| 2004/0002897 A1* | 1/2004 | Vishik | G06Q 30/02 705/14.51 |
| 2004/0006497 A1 | 1/2004 | Nestor | |
| 2004/0030658 A1* | 2/2004 | Cruz | G06Q 20/045 705/65 |
| 2004/0034544 A1 | 2/2004 | Fields | |
| 2004/0039709 A1* | 2/2004 | Pirhonen | G06Q 20/16 705/72 |
| 2004/0064407 A1* | 4/2004 | Kight | G06Q 20/04 705/40 |
| 2004/0064408 A1* | 4/2004 | Kight | G06Q 20/04 705/40 |
| 2004/0064409 A1* | 4/2004 | Kight | G06Q 20/04 705/40 |
| 2004/0064410 A1* | 4/2004 | Kight | G06Q 20/04 705/40 |
| 2004/0073497 A1* | 4/2004 | Hayes | G06Q 30/0601 705/26.1 |
| 2004/0078329 A1* | 4/2004 | Kight | G06Q 20/04 705/40 |
| 2004/0083167 A1* | 4/2004 | Kight | G06Q 20/04 705/40 |
| 2004/0093271 A1* | 5/2004 | Walker | G06Q 30/02 705/14.17 |
| 2004/0111320 A1* | 6/2004 | Schlieffers | A47F 9/047 705/16 |
| 2004/0122768 A1* | 6/2004 | Creamer | G06Q 20/105 705/41 |
| 2004/0127256 A1* | 7/2004 | Goldthwaite | G06K 7/0004 455/558 |
| 2004/0143545 A1* | 7/2004 | Kulakowski | G06Q 20/02 705/39 |
| 2004/0143550 A1* | 7/2004 | Creamer | G06Q 20/04 705/41 |
| 2004/0148226 A1* | 7/2004 | Shanahan | G06Q 30/0241 705/14.73 |
| 2004/0168052 A1* | 8/2004 | Clisham | H04L 63/0428 713/153 |
| 2004/0188520 A1* | 9/2004 | Kohta | G06K 19/10 235/382 |
| 2004/0216108 A1* | 10/2004 | Robbin | G06Q 20/04 718/100 |
| 2004/0235450 A1* | 11/2004 | Rosenberg | G06Q 20/085 455/406 |
| 2004/0243479 A1* | 12/2004 | Gross | G06Q 30/02 705/26.25 |
| 2004/0243519 A1 | 12/2004 | Perttila | |
| 2004/0254836 A1* | 12/2004 | Emoke Barabas | G06Q 30/02 705/14.35 |
| 2004/0267618 A1 | 12/2004 | Judicibus | |

(56) References Cited

U.S. PATENT DOCUMENTS

| | | | |
|---|---|---|---|
| 2004/0267665 A1 | 12/2004 | Nam | |
| 2005/0001711 A1* | 1/2005 | Doughty | G06Q 20/327 340/5.74 |
| 2005/0003810 A1 | 1/2005 | Chu | |
| 2005/0017068 A1* | 1/2005 | Zalewski | G06O 20/04 235/380 |
| 2005/0021478 A1* | 1/2005 | Gautier | G06Q 20/12 705/65 |
| 2005/0037735 A1* | 2/2005 | Coutts | G06Q 20/227 455/411 |
| 2005/0040230 A1* | 2/2005 | Swartz | G06K 17/00 |
| 2005/0043994 A1* | 2/2005 | Walker | B42D 15/00 705/14.19 |
| 2005/0050345 A1* | 3/2005 | Dowdy | G06F 21/10 713/193 |
| 2005/0071780 A1* | 3/2005 | Muller | G06Q 20/10 715/825 |
| 2005/0076210 A1 | 4/2005 | Thomas | |
| 2005/0131837 A1* | 6/2005 | Sanctis | G06Q 20/12 705/64 |
| 2005/0150945 A1* | 7/2005 | Choi | G06O 20/108 235/379 |
| 2005/0165646 A1* | 7/2005 | Tedesco | B42D 15/00 705/14.1 |
| 2005/0177517 A1* | 8/2005 | Leung | G06Q 20/20 705/64 |
| 2005/0187873 A1* | 8/2005 | Labrou | G06O 20/02 705/40 |
| 2005/0203959 A1* | 9/2005 | Muller | G06Q 20/04 |
| 2005/0210387 A1* | 9/2005 | Alagappan | G06O 30/06 715/700 |
| 2005/0215231 A1 | 9/2005 | Bauchot | |
| 2005/0222961 A1* | 10/2005 | Staib | G06Q 20/327 705/64 |
| 2005/0240484 A1* | 10/2005 | Yan | G06Q 20/045 455/411 |
| 2005/0240494 A1* | 10/2005 | Cue | G06Q 10/107 705/26.1 |
| 2005/0278369 A1* | 12/2005 | Tokita | H04N 5/23293 |
| 2005/0283444 A1* | 12/2005 | Ekberg | G06O 20/02 705/67 |
| 2006/0014518 A1* | 1/2006 | Huh | H04M 15/06 455/406 |
| 2006/0015580 A1* | 1/2006 | Gabriel | H04N 7/17309 709/219 |
| 2006/0031160 A1* | 2/2006 | Villa | G06Q 20/10 705/44 |
| 2006/0031752 A1* | 2/2006 | Surloff | G06F 3/021 715/205 |
| 2006/0044153 A1* | 3/2006 | Dawidowsky | G06K 19/0723 340/4.3 |
| 2006/0085271 A1* | 4/2006 | Tokita | G06Q 30/06 705/26.8 |
| 2006/0085310 A1* | 4/2006 | Mylet | G06Q 20/40 705/35 |
| 2006/0085840 A1* | 4/2006 | Bruck | G06F 21/10 726/3 |
| 2006/0089874 A1* | 4/2006 | Newman | |
| 2006/0089949 A1* | 4/2006 | Robbin | G06Q 30/00 |
| 2006/0095339 A1* | 5/2006 | Hayashi | G06Q 30/06 705/26.8 |
| 2006/0100924 A1* | 5/2006 | Tevanian, Jr. | G06Q 30/02 705/14.23 |
| 2006/0123052 A1* | 6/2006 | Robbin | G06Q 30/0601 |
| 2006/0135156 A1* | 6/2006 | Malu | H04W 8/18 455/432.3 |
| 2006/0143091 A1* | 6/2006 | Yuan | G06Q 20/343 705/26.1 |
| 2006/0165060 A1* | 7/2006 | Dua | G06Q 20/20 370/352 |
| 2006/0170759 A1* | 8/2006 | Roever | G07F 17/16 348/14.03 |
| 2006/0174314 A1* | 8/2006 | Jacobs | H04L 29/06027 725/135 |
| 2006/0180660 A1* | 8/2006 | Gray | G06Q 20/24 235/380 |
| 2006/0190351 A1* | 8/2006 | Dennis | G06Q 20/04 379/201.01 |
| 2006/0191995 A1* | 8/2006 | Stewart | G06F 21/6245 235/379 |
| 2006/0206709 A1* | 9/2006 | Labrou | G06Q 20/18 713/167 |
| 2006/0218092 A1* | 9/2006 | Tedesco | B42D 15/00 705/40 |
| 2006/0219780 A1* | 10/2006 | Swartz | G06K 17/00 235/383 |
| 2006/0235864 A1* | 10/2006 | Hotelling | G06Q 30/0601 |
| 2006/0247976 A1* | 11/2006 | Posokhow | G06Q 30/06 705/26.81 |
| 2006/0248113 A1* | 11/2006 | Leffert | G06Q 30/06 |
| 2006/0248114 A1* | 11/2006 | Anderson | G06Q 30/06 |
| 2006/0261149 A1* | 11/2006 | Raghavendra Tulluri | G07F 19/20 235/379 |
| 2006/0265637 A1* | 11/2006 | Marriott | G11B 27/11 715/210 |
| 2006/0287920 A1* | 12/2006 | Perkins | G06Q 30/0251 705/14.49 |
| 2006/0294025 A1* | 12/2006 | Mengerink | |
| 2007/0004391 A1 | 1/2007 | Maffeis | |
| 2007/0011099 A1* | 1/2007 | Sheehan | G06Q 20/32 705/65 |
| 2007/0012763 A1* | 1/2007 | Van de Velde et al. | 235/380 |
| 2007/0021969 A1* | 1/2007 | Homeier-Beals | G06Q 20/06 705/1.1 |
| 2007/0022058 A1* | 1/2007 | Labrou | G06Q 20/32 705/67 |
| 2007/0095892 A1 | 5/2007 | Lyons | |
| 2007/0125838 A1* | 6/2007 | Law | G06O 20/04 235/379 |
| 2007/0125840 A1* | 6/2007 | Law | G06Q 20/10 235/379 |
| 2007/0138299 A1* | 6/2007 | Mitra | G06K 19/0719 235/492 |
| 2007/0131759 A1 | 7/2007 | Cox | |
| 2007/0156436 A1* | 7/2007 | Fisher | G06Q 20/102 455/552.1 |
| 2007/0169115 A1* | 7/2007 | Ko | H04L 12/2803 717/174 |
| 2007/0175978 A1* | 8/2007 | Stambaugh | G06Q 20/32 235/379 |
| 2007/0179883 A1* | 8/2007 | Questembert | G06Q 20/06 705/39 |
| 2007/0210155 A1* | 9/2007 | Swartz | G06K 17/00 235/383 |
| 2007/0235519 A1 | 10/2007 | Jang | |
| 2007/0235539 A1* | 10/2007 | Sevanto | G06K 7/10237 235/451 |
| 2007/0239611 A1* | 10/2007 | Blum | G06F 17/30749 705/51 |
| 2007/0255662 A1 | 11/2007 | Tumminaro | |
| 2007/0262139 A1* | 11/2007 | Fiebiger | G06Q 20/20 235/380 |
| 2007/0270166 A1* | 11/2007 | Hampel | H04L 12/5865 455/456.3 |
| 2007/0288966 A1* | 12/2007 | Javid | H04N 7/17318 725/46 |
| 2007/0293155 A1* | 12/2007 | Liao | G06Q 20/32 455/41.2 |
| 2008/0004952 A1* | 1/2008 | Koli | G06Q 20/10 235/379 |
| 2008/0006685 A1* | 1/2008 | Rackley, III | G06Q 20/32 235/380 |
| 2008/0010190 A1* | 1/2008 | Rackley, III | G06Q 20/042 705/39 |
| 2008/0010191 A1* | 1/2008 | Rackley, III | G06Q 30/02 705/14.55 |

(56) References Cited

U.S. PATENT DOCUMENTS

| | | | | |
|---|---|---|---|---|
| 2008/0010192 A1* | 1/2008 | Rackley, III | G06Q 20/042 | 705/39 |
| 2008/0010193 A1* | 1/2008 | Rackley, III | G06Q 20/042 | 705/39 |
| 2008/0010196 A1* | 1/2008 | Rackley, III | | 705/39 |
| 2008/0010204 A1* | 1/2008 | Rackley, III | G06Q 20/042 | 705/45 |
| 2008/0010215 A1* | 1/2008 | Rackley, III | G06Q 20/042 | 705/70 |
| 2008/0011825 A1* | 1/2008 | Giordano | G06Q 20/04 | 235/380 |
| 2008/0017704 A1* | 1/2008 | VanDeburg | G06Q 20/20 | 705/14.14 |
| 2008/0027795 A1* | 1/2008 | Medlin | G06Q 40/00 | 705/40 |
| 2008/0040265 A1* | 2/2008 | Rackley, III | G06Q 20/02 | 705/40 |
| 2008/0045172 A1* | 2/2008 | Narayanaswami | G06Q 20/102 | 705/40 |
| 2008/0046366 A1* | 2/2008 | Bemmel | G06Q 20/20 | 705/44 |
| 2008/0048022 A1* | 2/2008 | Vawter | G06Q 20/32 | 235/380 |
| 2008/0051059 A1* | 2/2008 | Fisher | G06Q 20/20 | 455/410 |
| 2008/0051142 A1* | 2/2008 | Calvet | H04W 88/02 | 455/558 |
| 2008/0052192 A1* | 2/2008 | Fisher | G06Q 10/02 | 705/5 |
| 2008/0052233 A1* | 2/2008 | Fisher | G06Q 20/042 | 705/39 |
| 2008/0059329 A1* | 3/2008 | Luchene | G06Q 30/0603 | 705/26.35 |
| 2008/0126145 A1* | 5/2008 | Rackley, III | G06Q 20/102 | 455/406 |
| 2008/0133336 A1* | 6/2008 | Altman | G06Q 30/0207 | 455/456.1 |
| 2008/0139155 A1 | 6/2008 | Boireau | | |
| 2008/0140520 A1* | 6/2008 | Hyder | G06Q 20/342 | 705/14.1 |
| 2008/0148040 A1* | 6/2008 | Machani | G06F 21/6245 | 713/150 |
| 2008/0167017 A1* | 7/2008 | Wentker | G06Q 20/10 | 455/414.1 |
| 2008/0167961 A1* | 7/2008 | Wentker | G06Q 20/10 | 705/14.25 |
| 2008/0167988 A1* | 7/2008 | Sun | G06Q 20/085 | 705/39 |
| 2008/0172274 A1* | 7/2008 | Hurowitz | H04W 4/02 | 455/433 |
| 2008/0172285 A1* | 7/2008 | Hurowitz | G06Q 30/02 | 455/414.1 |
| 2008/0172291 A1* | 7/2008 | Hurowitz | G06Q 30/02 | 705/14.1 |
| 2008/0172292 A1* | 7/2008 | Hurowitz | G06Q 30/02 | 705/14.14 |
| 2008/0177668 A1 | 7/2008 | Delean | | |
| 2008/0207234 A1* | 8/2008 | Arthur | G06Q 20/20 | 455/466 |
| 2008/0208681 A1 | 8/2008 | Hammad | | |
| 2008/0208743 A1* | 8/2008 | Arthur | G06Q 40/00 | 705/41 |
| 2008/0208744 A1* | 8/2008 | Arthur | G06Q 20/105 | 705/41 |
| 2008/0208762 A1* | 8/2008 | Arthur | G06Q 20/027 | 705/79 |
| 2008/0221997 A1* | 9/2008 | Wolfe | G06Q 30/02 | 705/14.26 |
| 2008/0242274 A1* | 10/2008 | Swanburg | G06Q 20/3223 | 455/414.1 |
| 2008/0249938 A1* | 10/2008 | Drake-Stoker | G06Q 20/12 | 705/44 |
| 2008/0251580 A1* | 10/2008 | Van de Velde et al. | | 235/380 |
| 2008/0255947 A1* | 10/2008 | Friedman | G06Q 20/20 | 705/35 |
| 2008/0262928 A1* | 10/2008 | Michaelis | G06Q 30/02 | 705/14.26 |
| 2008/0274794 A1* | 11/2008 | Mathieson | G06Q 30/02 | 463/25 |
| 2008/0275779 A1* | 11/2008 | Lakshminarayanan | G06Q 20/02 | 705/39 |
| 2008/0294556 A1 | 11/2008 | Anderson | | |
| 2008/0305774 A1 | 12/2008 | Ramakrishna | | |
| 2008/0319915 A1* | 12/2008 | Russell | | 705/76 |
| 2009/0018913 A1* | 1/2009 | Sarukkai | G06Q 30/02 | 705/14.56 |
| 2009/0061884 A1* | 3/2009 | Rajan | G06Q 30/02 | 455/445 |
| 2009/0063312 A1* | 3/2009 | Hurst | G06Q 20/105 | 705/30 |
| 2009/0076912 A1* | 3/2009 | Rajan | G06Q 30/0267 | 705/14.64 |
| 2009/0098825 A1 | 4/2009 | Huomo | | |
| 2009/0106112 A1* | 4/2009 | Dalmia | G06Q 20/04 | 705/14.17 |
| 2009/0112747 A1* | 4/2009 | Mullen | G06Q 20/04 | 705/35 |
| 2009/0124234 A1* | 5/2009 | Fisher | G06Q 20/32 | 455/406 |
| 2009/0132362 A1* | 5/2009 | Fisher | G06Q 10/06 | 705/14.47 |
| 2009/0143104 A1* | 6/2009 | Loh | G06Q 20/32 | 455/558 |
| 2009/0144161 A1* | 6/2009 | Fisher | G06Q 20/20 | 705/16 |
| 2009/0177587 A1* | 7/2009 | Siegal | G06F 21/32 | 705/67 |
| 2009/0227281 A1* | 9/2009 | Hammad | G06K 19/07309 | 455/550.1 |
| 2010/0057619 A1* | 3/2010 | Weller | G06Q 20/02 | 705/67 |
| 2010/0063895 A1* | 3/2010 | Dominguez | G06O 20/02 | 705/26.1 |
| 2010/0145835 A1* | 6/2010 | Davis | G06Q 20/10 | 705/30 |
| 2010/0312694 A1* | 12/2010 | Homeier-Beals | G06Q 20/10 | 705/39 |
| 2011/0055038 A1* | 3/2011 | Mengerink | G06Q 20/085 | 705/26.1 |
| 2011/0320316 A1* | 12/2011 | Randazza | G06Q 20/02 | 705/26.43 |
| 2012/0030044 A1* | 2/2012 | Hurst | G06Q 20/105 | 705/18 |
| 2012/0150744 A1* | 6/2012 | Carlson | G06Q 20/02 | 705/44 |
| 2012/0215573 A1* | 8/2012 | Sussman | G06F 9/50 | 705/5 |
| 2012/0220314 A1* | 8/2012 | Altman | G06Q 30/0207 | 455/456.3 |
| 2012/0265677 A1* | 10/2012 | Rackley, III | G06Q 20/02 | 705/41 |
| 2013/0013501 A1* | 1/2013 | Rackley, III | G06Q 20/02 | 705/41 |
| 2013/0054470 A1* | 2/2013 | Campos | G06Q 20/36 | 705/67 |
| 2013/0212016 A1* | 8/2013 | Davis | G06Q 20/10 | 705/42 |

OTHER PUBLICATIONS

U.S. Appl. No. 11/933,351, Office Action dated Oct. 3, 2008, 5 p.
U.S. Appl. No. 11/933,367, Office Action dated May 27, 2010, 8 p.
U.S. Appl. No. 11/467,441, Office Action dated May 27, 2009, 17 p.
U.S. Appl. No. 12/592,581, Office Action dated Jun. 4, 2010, 20 p.

(56) References Cited

OTHER PUBLICATIONS

U.S. Appl. No. 11/939,821, Office Action dated Aug. 17, 2010, 11 p.
U.S. Appl. No. 11/933,351, Office Action dated Aug. 18, 2010, 16 p.
U.S. Appl. No. 11/933,321, Office Action dated May 27, 2010, 11 p.
Deena, M. Amato, "Mobile Rewards." Chain Store Age 82.5 (2006): 160, 161, 163. Hoover's Company Profiles; ProQuest Central. Web. Oct. 5, 2012.
"ViVOtech to Demonstrate Industry's First End-to-End Near Field Communication (NFC) Solution at the NRF Show." Business Wire: 1 Jan. 16, 2006. Business Dateline; Hoover's Company Profiles; ProQuest Central. Web. Oct. 5, 2012.
ECMA NFC-Interface and Protocol (NCPIP-1) standard, 2nd edition published in Dec. 2004.

* cited by examiner

REMOTE TRANSACTION PROCESSING AT A SERVER WITH AUTHENTICATION AFTER A PRODUCT LIST

CROSS-REFERENCE TO RELATED APPLICATIONS

This application is a continuation of application Ser. No. 13/735,337, filed Jan. 7, 2013, titled REMOTE TRANSACTION PROCESSING USING AUTHENTICATION INFORMATION, which is a continuation of application Ser. No. 11/948,903, filed Nov. 30, 2007, titled METHOD AND SYSTEM FOR CONDUCTING AN ONLINE PAYMENT TRANSACTION USING A MOBILE COMMUNICATION DEVICE, now U.S. Pat. No. 8,352,323, issued on Jan. 8, 2013, both of which are incorporated by reference herein in their entirety.

FIELD OF INVENTION

The present invention relates to data communications and wireless devices.

BACKGROUND OF THE INVENTION

Mobile communication devices—e.g., cellular phones, personal digital assistants, and the like—are increasingly being used to conduct payment transactions as described in U.S. patent application Ser. No. 11/933,351, entitled "Method and System For Scheduling A Banking Transaction Through A Mobile Communication Device", and U.S. patent application Ser. No. 11/467,441, entitled "Method and Apparatus For Completing A Transaction Using A Wireless Mobile Communication Channel and Another Communication Channel, both of which are incorporated herein by reference. Such payment transactions can include, for example, purchasing goods and/or services, bill payments, and transferring funds between bank accounts.

BRIEF SUMMARY OF THE INVENTION

In general, this specification describes a method and system for conducting an online payment transaction through a point of sale device. The method includes receiving input from a user selecting an item for purchase through the point of sale device; calculating a total purchase amount for the item in response to a request from the user to purchase the item; and sending payment authorization for the total purchase amount from the point of sale device to a payment entity, in which the payment authorization is sent to the payment entity via a mobile communication device of the user. The method further includes receiving a result of the payment authorization from the payment entity through the mobile communication device; and completing the payment transaction based on the result of the payment authorization.

Particular implementations can include one or more of the following features. The point of sale device can be a desktop computer, a laptop computer, or a terminal. The mobile communication device can be a cellular phone, a wireless personal digital assistant (PDA), or a laptop computer. The cellular phone can be an NFC-enabled phone. Sending payment authorization for the total purchase amount from the point of sale device to a payment entity can include sending the payment authorization securely to the payment entity. The payment entity can be a person, a computer system, or a bank. The method can further include maintaining a shopping list on the mobile communication device of the user, in which the shopping list includes a listing of one or more items to be purchased by the user. The payment authorization can be an authorization for payment with a credit card, a debit card, or a prepaid card.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF THE INVENTION

Figure 1:
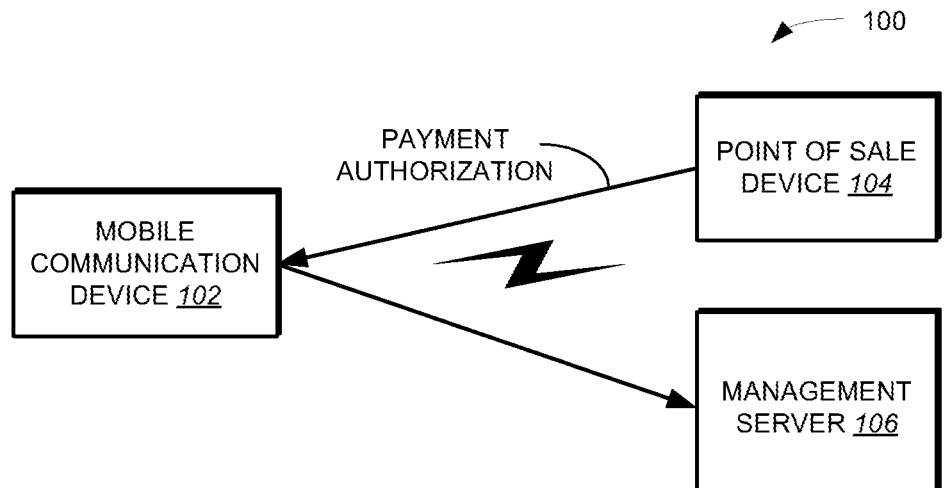
FIG. 1 illustrates a block diagram of a communication system including a wireless mobile communication device and a management server in accordance with one implementation.

FIG. 1 illustrates one implementation of a communication system 100. The communication system 100 includes a hand-held, wireless mobile communication device 102 a point-of-sale device 104 and a management server 106. In one implementation, the mobile communication device 102 includes a mobile application (discussed in greater detail below) that permits a user of the mobile communication device 102 to conduct payment transactions. Payment transactions can include, for example, using contactless payment technology at a retail merchant point of sale (e.g., through point of sale device 104), using mobile/internet commerce (e.g., purchase tickets and products, etc.), storage of payment information and other digital artifacts (e.g., receipts, tickets, coupons, etc.), storage of banking information (payment account numbers, security codes, PIN's, etc.), and accessing banking service (account balance, payment history, bill pay, fund transfer, etc.), and so on. The mobile communication device 102 can be a cellular phone, a wireless personal digital assistant (PDA), a laptop computer, or other wireless communication device. The point of sale device 104 can be a desktop computer, laptop computer, terminal, or other device that is configured to receive user input selecting items for purchase or other transaction.

In one implementation, authorizations for payment transactions that are made through the point of sale device 104 are sent from the point of sale device 104 to an issuer authorization (e.g., management server 106) through the mobile communication device 102 (as shown in FIG. 1). In one implementation, an issuer authorization is a payment entity that either approves or disapproves a payment transaction. An issuer authorization can be, e.g., a person, computer system, bank (or other third party). One potential benefit of having payment authorizations flow through the mobile communication device 102 is that sensitive user information (e.g. account numbers, pin numbers, and/or identity information) need only be sent from the mobile communication device 102 directly to an issuer authorization. Such operation reduces the potential for identity theft and/or fraudulent purchases made through a point of sale device. For example, (in one implementation) payment authorizations cannot be sent to an issuer authorization if the mobile communication device 102 is turned off.

Figure 2:
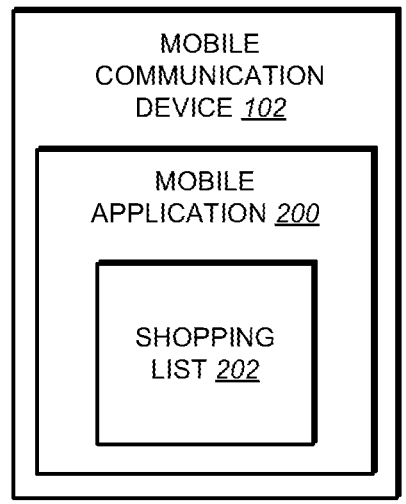
FIG. 2 illustrates one implementation of the wireless mobile communication device of FIG. 1.

FIG. 2 illustrates one implementation of the mobile communication device 102. The mobile communication device 102 includes a mobile application 200 that (in one implementation) is provided to the mobile communication device 102 through a remote server (e.g., management server 106). In one implementation, the mobile application is a Mobile Wallet application available from Mobile Candy Dish, Inc., of Alameda, Calif. In one implementation, the mobile application is a hosted service, as described in U.S. patent application Ser. No. 11/939,821, entitled "Method and System For Securing Transactions Made Through a Mobile Communication Device", which is incorporated herein by reference. In one implementation, the mobile application 200 is configured to send requests to the management server for artifacts based on user input, e.g., received though a keypad (not shown) of the mobile communication device 102. Requests to the management server 106 can also be automated, via proximity-based services, e.g., consumer tapping (or in close proximity) an LBS/contactless/RFID enabled phone against a smart poster (RFID/Bluetooth/LBS enabled, etc.), kiosk, or other device.

In one implementation, the mobile application 200 running on the mobile communication device 102 is configured to receive artifacts (e.g., advertisements, receipts, tickets, coupons, media, content, and so on) from the management server 106. In one implementation, the management server 106 sends artifacts to the mobile application based on user profile information and/or a transaction history (or payment trends) associated with a user of the mobile communication device 102 as described in U.S. patent application Ser. No. 11/944,267, entitled "Method and System For Delivering Information To a Mobile Communication Device Based On Consumer Transactions", which is incorporated herein by reference.

In one implementation, the mobile communication device 102 is an NFC-enabled phone. The mobile communication device 102 can be NFC-enabled, for example, through an embedded chip or a sticker that is affixed to the cellular phone, as described in U.S. application Ser. No. 11/933,321, entitled "Method and System For Adapting a Wireless Mobile Communication Device For Wireless Transactions", which is incorporated herein by reference. In one implementation, the NFC chip (or sticker) on the cellular phone can be used in conjunction with a merchant's point of sale device as described in greater detail below.

Figure 4:
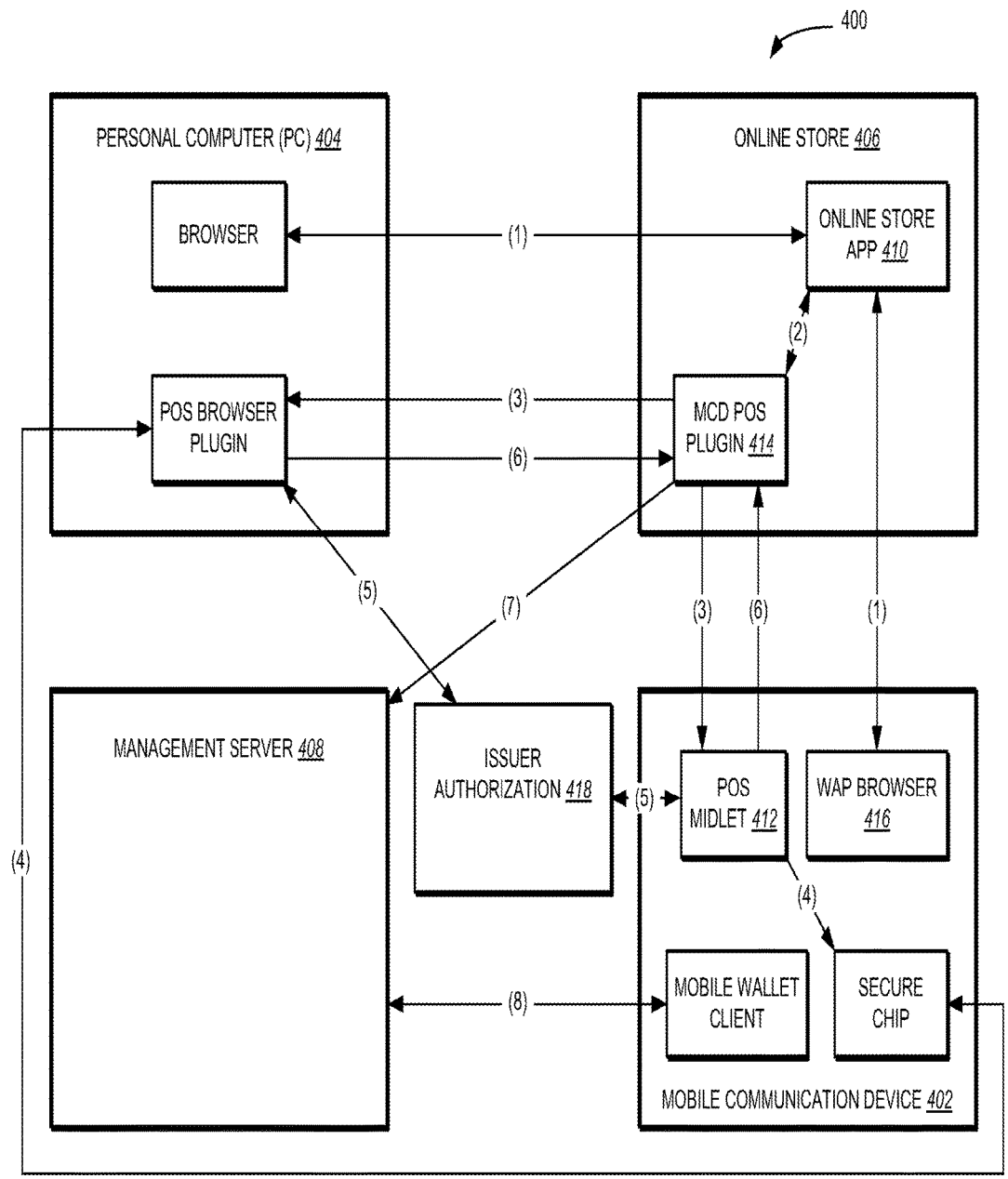
FIG. 4 illustrates a block diagram of a communication system including a wireless mobile communication device and an online store in accordance with one implementation.

For example, with reference to FIG. 4, in one implementation, the NFC chip (or sticker) on the cellular phone can communicate with NFC chips that are installed on the front of PC's (TV's, Kiosks, or any other device) and serve as scanners/readers. In this implementation a mobile candy dish applet (e.g., MCD POS plugin 414) is installed on the consumer's computer (e.g., PC 404) which interfaces with the NFC chip on the PC. When a consumer (or user) is shopping online and they are ready to pay for their products, the consumer opens his mobile wallet and selects one of the payment methods (e.g., credit card, debit card, prepaid card, etc.) from their mobile wallet. If a default card has been selected already, this step is not necessary. The consumer then waves their phone over the NFC reader present on the PC 404. The consumer's payment credentials are transferred from the phone to the merchant website (e.g., online store application 410) using a communication protocol between the chip in the phone and the chip in the PC, which can be radio frequency for example. If the consumer has coupons in their mobile wallet the consumer can either elect to manually apply the coupon, save the coupon for a future use (against a larger purchase for example), or have the coupon automatically applied during the transaction and the transaction amount is updated. After the consumer enters any necessary validation information (e.g., pin) to provide a multi-factor authentication and confirms the transaction, the online purchase is processed as normal by the merchant's online processor. The mobile wallet can retrieve transaction data, account balance from the management server 408.

In one implementation, the mobile communication device 102 is a non NFC-enabled phone. In this implementation, the consumer connects his phone to the PC 404 via some non radio frequency method (e.g., IR, Bluetooth, USB cable, etc.). When a consumer is shopping online and they are ready to pay for their products, the consumer opens his mobile wallet and selects one of the payment methods (e.g., credit card, debit card, prepaid card, etc.) from their mobile wallet. If a default card has been selected already, this step is not necessary. The consumer then pushes, e.g., a "Buy now" button and the consumer's payment credentials are transferred from the phone to the merchant website (e.g., online store application 410) using the protocol between the phone and the PC 404 which can be radio frequency, for example. If the consumer has coupons in their mobile wallet the consumer can either elect to manually apply the coupon, save the coupon for a future use, or have the coupon automatically applied during the transaction and the transaction amount is updated. After the consumer enters any necessary validation information (e.g., pin) to provide multi-factor authentication and confirms the transaction, the online purchase is processed as normal by the merchant's online processor. The mobile wallet can retrieve transaction data and account balance from the management server 408.

In one implementation, the management server 408 and merchant portal (e.g., online store 408) are maintained by trusted parties and use an encrypted tunnel to transfer financial data. When the consumer is ready to pay for their online product, they enter their cell phone number on the merchant portal. The merchant portal (which has an MCD applet (e.g., MCD POS plugin 414) installed on its server) securely connects to the management server 408 (that in one implemetation is maintained by Mobile Candy Dish (MCD)). In one implementation, the management server 408 identifies the consumer through their cell phone number, and verifies the consumer's authenticity by sending a unique transaction code to the consumer mobile wallet on their cell phone. The consumer then enters this unique transaction code onto the merchant's web portal. The merchant portal sends this transaction number to the management server 408 for authentication. Upon authentication, the consumer's virtual wallet and payment methods (e.g., credit card, debit card, prepaid card, etc.) are securely retrieved from the management server 408 and are displayed to the consumer in a window on a website associated with the merchant portal. The consumer selects one of these payment methods to pay for their transaction. If a default card has been selected already, this step is not necessary. If the consumer has coupons in their mobile wallet the consumer can either elect to manually apply the coupon, save the coupon for a future use, or have the coupon automatically applied during the transaction and the transaction amount is updated. After the consumer enters any necessary validation information to provide a multi-factor authentication and confirms the transaction, the online purchase is processed as normal by the merchant's online processor. The mobile wallet can retrieve transaction data, account balance from the management server 408.

Referring to FIG. 2, in one implementation, the mobile application 200 maintains a shopping list 202 for a consumer. Accordingly, consumers have the ability to store their shopping list in their mobile wallet and add, delete, or change items on their shopping list either in offline or online mode. In one implementation, consumers are sent coupons based on items on their shopping list, preferences, previous shopping history, proximity to the physical retail store, or a combination of these parameters, as discussed in application Ser. No. 11/944,267, which is incorporated by reference above. If the consumer has coupons in their mobile wallet the consumer can either elect to manually apply the coupon, save the coupon for a future use, or have the coupon automatically applied during the transaction and the transaction amount is updated. When a consumer wants to order the items on their shopping list via an on online merchant (in contrast to a physical retail store), the consumer can logon to the merchant portal and electronically transmit their shopping list to the merchant portal either by waving their phone over NFC enabled PC's or some other connection such as IR, bluetooth, USB, or the like.

Figure 3:
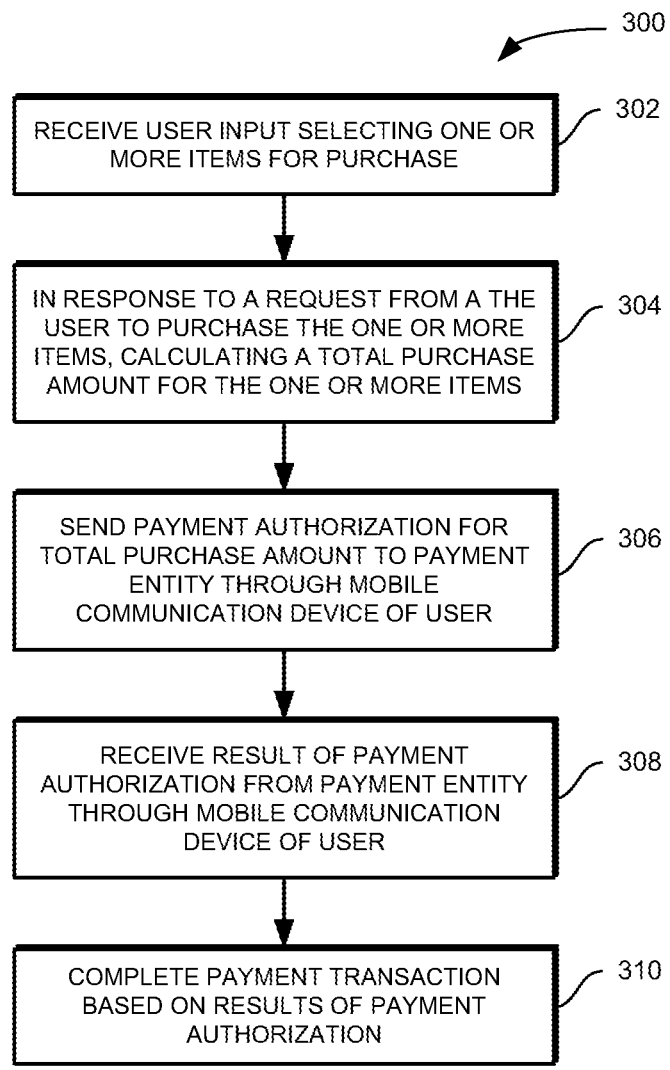
FIG. 3 is a method for conducting a payment transaction using a point of sale device in accordance with one implementation.

FIG. 3 illustrates a method 300 for conducting a payment transaction using a point of sale device (e.g., point of sale device 104). User input is received selecting one or more items for purchase (e.g., at the point of sale device) (step 302). In general, the transaction being made at the point of sale device can be any type of transaction that involves the exchange or transfer of funds—e.g., the transaction can be a payment transaction, a fund transfer, or other type of transaction. In response to a request from the user to purchase the one or more items, a total purchase amount for the one or more items is calculated (e.g., by the point of sale device) (step 304). If the user has coupons in their mobile wallet the user can either manually apply the coupon or have the coupon automatically applied during the transaction and the transaction amount is updated. The user request to purchase an item can be received, e.g., by a user clicking on a "buy now" icon that is displayed on a graphical user interface of the point of sale device. Payment authorization for the total purchase amount is sent to a payment entity through a mobile communication device of the user (step 306). A result of the payment authorization is received at the point of sale device from the payment entity via the mobile communication device (step 308). The payment transaction is completed based on the result of the payment authorization (step 310). If the payment transaction was authorized by the payment entity, then the sale of the items through the point of sale device is completed. Otherwise, if the payment transaction was not authorized by the payment entity, then the point of sale device terminates the payment transaction.

FIG. 4 illustrates an example payment transaction being made in a communication system 400 in accordance with one implementation. The communication system 400 includes a mobile communication device 402, a personal computer (PC) 404, an online store 406, and a core (or datastore) 408. As indicated by interaction (1), a user (or customer), using a phone (e.g., mobile communication device 402 or personal computer 404), browses an online store website (online store application 410) and finds an item that the customer wishes to purchase. This could also be a purchase made through a midlet application (POS midlet 412) residing on the mobile communication device 402. The user then goes to, e.g., a checkout of the online store 406 make a purchase. If the user has coupons in their mobile wallet the user can either manually apply the coupon or have the coupon automatically applied during the transaction and the transaction amount is updated. When it comes time to authorize the purchase, (in one implementation) the user is given an option to purchase with the mobile communication device 402. In one implementation, the mobile communication device 402 is an NFC-equipped phone (or NFC phone).

In interaction (2), when the user chooses to purchase with the mobile communication device 402, the online store application 410 sends the transaction information for authorization to the POS vendor plugin (e.g., MCD POS plugin 414). In one implementation, the POS vendor plugin is installed in the merchant's online store and enables the merchant to accepts MCD Blaze payments as an alternative form of payment, similar to accepting credit cards for payment. As shown by interaction (3), the POS vendor plugin formats, encrypts, and cryptographically signs the purchase authorization request which is sent via a secure SSL link (e.g., HTTPS, Bluetooth, IR, USB, or other suitable protocol) established by the browser/web application 416 back to the mobile communication device 402. As with the first scenario, all communications is over secure channels. (It may be required that the mobile wallet application be opened prior to beginning a phone online purchase.) The POS midlet 412 is a component of the mobile wallet application that executes PayPass or other payment authorization protocol between itself and the SE payment applications on the mobile communication device 402 (interaction (4)). The results of the request are sent back to the POS vendor plugin.

As shown by interaction (5), the POS midlet 412 then forwards the properly formatted authorization request to a payment entity (e.g., issuer authorization 418) for authorization. The results of the request are then sent back to the POS component of the mobile wallet. Through interaction (6), the POS midlet 412 then forwards the results back to the MCD POS plugin 414 to complete the purchase. The MCD POS plugin 414 then forwards the purchase transaction information to the management server 408 for later customer viewing (interaction (7)). As indicated by interaction (8), users (or customers) will then be able to query the management server 408 and immediately obtain purchase information, either by phone or PC.

One or more of method steps described above can be performed by one or more programmable processors executing a computer program to perform functions by operating on input data and generating output. Generally, the invention can take the form of an entirely hardware embodiment, an entirely software embodiment or an embodiment containing both hardware and software elements. In one implementation, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Figure 5:
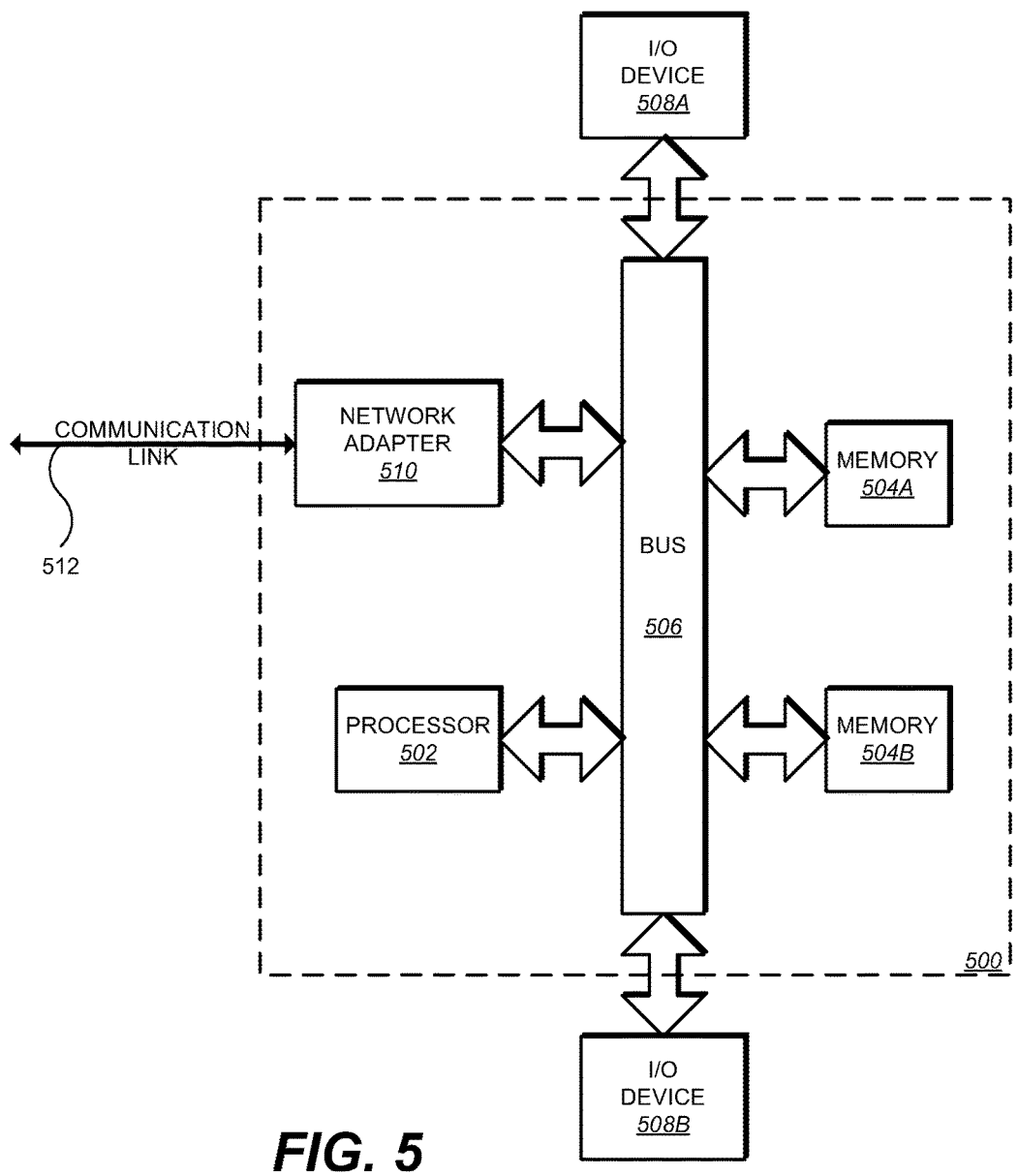
FIG. 5 is a block diagram of a data processing system suitable for storing and/or executing program code in accordance with one implementation.

FIG. 5 illustrates a data processing system 500 suitable for storing and/or executing program code. Data processing system 500 includes a processor 502 coupled to memory elements 504A-B through a system bus 506. In other implementations, data processing system 500 may include more than one processor and each processor may be coupled directly or indirectly to one or more memory elements through a system bus. Memory elements 504A-B can include local memory employed during actual execution of the program code, bulk storage, and cache memories that provide temporary storage of at least some program code in order to reduce the number of times the code must be retrieved from bulk storage during execution. As shown, input/output or I/O devices 508A-B (including, but not limited to, keyboards, displays, pointing devices, etc.) are coupled to data processing system 500. I/O devices 508A-B may be coupled to data processing system 500 directly or indirectly through intervening I/O controllers (not shown).

In one implementation, a network adapter 510 is coupled to data processing system 500 to enable data processing system 500 to become coupled to other data processing systems or remote printers or storage devices through communication link 512. Communication link 512 can be a private or public network. Modems, cable modems, and Ethernet cards are just a few of the currently available types of network adapters.

Although the present invention has been particularly described with reference to implementations discussed above, various changes, modifications and substitutes are can be made. Accordingly, it will be appreciated that in numerous instances some features of the invention can be employed without a corresponding use of other features. Further, variations can be made in the number and arrangement of components illustrated in the figures discussed above.

The invention claimed is:

1. A method for processing a transaction comprising:
maintaining, at a remote management server, a payment method;
sending a list of products from the remote management server to a non-browser based application generated screen for display using the non-browser based application generated screen, wherein the non-browser based application generated screen is generated by a non-browser based application which is a mobile operating system platform non-browser based mobile application with a graphical user interface that is preinstalled or downloaded and installed on a mobile device, the non-browser based application generated screen corresponding to a specific screen or area of the non-browser based application, the mobile device including the mobile device display, a mobile device processor, a mobile device wireless transceiver configured to support voice and data interactions through a first wireless communication channel including at least one of CDMA and GSM, and a mobile device wireless fidelity (Wi-Fi) transceiver;
receiving, at the remote management server, an identification of one or more products selected from a list of products, from the non-browser based application generated screen wherein the non-browser based application generated screen device receives the identification of one or more products selected from the list of products through user input via the mobile device display of the mobile device;
receiving, at the remote management server, user input login information including an identification code associated with a user and information related to a password from the non-browser based application generated screen, wherein the non-browser based application generated screen receives the user input login information including the identification code associated with the user and the information related to the password, through the user input via the mobile device display of the mobile device;
upon receipt of the user input login information including the identification code associated with the user and the information related to the password, authenticating, at the remote management server, the user associated with the user input login information;
receiving, at the remote management server, a transaction purchase request from the non-browser based application generated screen, wherein the non-browser based application generated screen receives the transaction purchase request through the user input via the mobile device display of the mobile device;
after receiving the transaction purchase request, transmitting, from the remote management server, the payment method to a transaction server which processes the transaction using the payment method;
receiving, at the remote management server, a transaction verification from the transaction server, wherein the transaction verification indicates that the transaction has been processed; and
after the transaction has been processed, sending, from the remote management server to the non-browser based application generated screen stored on the mobile device, a digital artifact for display within the non-browser based application generated screen using the mobile device display.

2. The method of claim 1, wherein the payment method is a default payment method.

3. The method of claim 1, wherein the payment method is a user selected payment method.

4. The method of claim 1, wherein the digital artifact is a receipt.

5. The method of claim 1, wherein the digital artifact is an advertisement or coupon.

6. The method of claim 1, wherein the digital artifact is content, media, or a ticket.

7. The method of claim 5, further wherein the advertisement or coupon is based on personal information and/or financial transaction related information.

8. The method of claim 7, wherein personal information comprises one or more of location, gender, age, interest, affiliation, userid, pageid, zip code, area code, and occupation.

9. The method of claim 7, wherein financial transaction related information comprises one or more of financial information related to historical payment transactions, financial information related to real-time payment transactions, financial information related to contactless transactions made using the mobile device, financial information related to internet commerce, financial information related to bill pay, financial information related to top spend categories, financial information related to merchants transactions, financial information related to storage of banking information, financial information related to account balance, financial information related to payment history, financial information related to funds transfer, financial information related to tickets, financial information related to receipts, financial information related to coupons, financial information related to transactions made by the user but not through the mobile device, and financial information related to raw data downloaded from banks.

10. A system for processing a transaction, comprising:
   a mobile device including
      a mobile device display;
      a mobile device processor;
      a mobile device memory which maintains a non-browser based application, wherein the non-browser based application is a mobile operating system platform non browser based mobile application with a graphical user interface that is preinstalled or downloaded and installed on the mobile device the non-browser based application generated screen corresponding to a specific screen or area of the non-browser based application;
      a mobile device wireless transceiver configured to support voice and data interactions through a first wireless communication channel including at least one of CDMA and GSM, and
      a mobile device wireless fidelity (Wi-Fi) transceiver,
   a transaction server;
   a remote management server that includes:
      a remote management server memory that maintains a payment method;
      a remote management server transceiver that:
         receives user input login information including an identification code associated with a user and information related to a password from the non-browser based application, wherein the non-browser based application receives the user input login information including the identification code associated with the user and the information related to the password, through user input via the mobile device display of the mobile device,
         sends a list of products to the non-browser based application generated screen for display using the non-browser based application generated screen;
         receives an identification of one or more products selected from a list of products, from the non-browser based application generated screen, wherein the non-browser based application generated screen receives the identification of one or more products selected from the list of products through the user input via the mobile device display of the mobile device;
         receives a transaction purchase request from the non-browser based application generated screen wherein the non-browser based application generated screen stored receives the transaction purchase request through the user input via the mobile device display of the mobile device;
         after receiving the transaction purchase request, transmits the payment method which corresponds to the identification code associated with the user to the transaction server which processes the transaction using the payment method;
         receives a transaction verification from the transaction server, wherein the transaction verification indicates that the transaction has been processed; and
         after the transaction has been processed, sends a digital artifact to the non-browser based application generated screen for display within the non-browser based application generated screen using the mobile device display; and
      a remote management server processor that
         upon receipt of the user input login information, including the identification code associated with the user and the information related to the password, authenticates the user associated with the user input login information.

11. A remote management server for processing a transaction comprising:
   a remote management server memory that maintains a payment method;
   a remote management transceiver that:
      sends a list of products to a non-browser based application generated screen for display on a mobile device using the non-browser based application generated screen, wherein the non-browser based application generated screen is generated by a non-browser based application which is a mobile operating system based application with a graphical user interface that is preinstalled or downloaded and installed on the mobile device, the non-browser based application generated screen corresponding to a specific screen or area of the non-browser based application, the mobile device including a mobile device display, a mobile device processor, a mobile device wireless transceiver that supports voice and data interactions through a first wireless communication channel using at least one of GSM and CDMA, and a mobile device wireless fidelity (Wi-Fi) transceiver;
      receives an identification of one or more products selected from the list of products from the non-browser based application generated screen, wherein the non-browser based application generated screen receives the identification of one or more products selected from the list of products through the user input via the mobile device display of the mobile device;
      receives user input login information including an identification code associated with a user and information related to a password from the non-browser based, wherein the non-browser based application receives the user input login information including the identification code associated with the user and the information related to the password, via the mobile device display of the mobile device;
      receives a transaction purchase request from the non-browser based application generated screen, wherein the non-browser based application generated screen receives the transaction purchase request through the user input via the mobile device display of the mobile device;
      after receiving the transaction purchase request, receives, a transaction verification from a transaction server which processes the transaction using the payment method that corresponds to the identification code associated with the user, wherein the transaction verification indicates that the transaction has been processed; and
      after the transaction has been processed, sends a digital artifact to the non-browser based application generated screen for display within the non-browser based application generated screen, and a remote management server processor that
upon receipt of the user input login information including the identification code associated with the user and the information related to the password, authenticates the user associated with the user input login information.

12. The system of claim 10, wherein the payment method is a default payment method.

13. The system of claim 10, wherein the payment method is a user selected payment method.

14. The system of claim 10, wherein the digital artifact is a receipt.

15. The system of claim 10, wherein the digital artifact is an advertisement or coupon.

16. The system of claim 10, wherein the digital artifact is content, media, or a ticket.

17. The system of claim 15, further wherein the advertisement or coupon is based on personal information and/or transaction related information.

18. The method of claim 1, further wherein the digital artifact can be used by the non-browser based application when there is no network connection.

19. The system of claim 10, further wherein the digital artifact can be used by the non-browser based application when there is no network connection.

20. The method of claim 1, further wherein data stored on the mobile device is encrypted using software tools native to the mobile operating system.

21. The system of claim 10, further wherein data stored on the mobile device is encrypted using software tools native to the mobile operating system.

22. The method of claim 1, wherein the mobile device has a secure element including a secure element processor configured for near field communication transaction processing, a secure element memory configured to maintain a secure element application, and a secure element near field communication transceiver.

23. The system of claim 10, wherein the mobile device has a secure element including a secure element processor configured for near field communication transaction processing, a secure element memory configured to maintain a secure element application, and a secure element near field communication transceiver.

24. The method of claim 1, further wherein the non-browser based application can be used when the mobile device is not connected to a wireless network.

25. The method of claim 24, further wherein the non-browser based application monitors for access to the wireless network and automatically reconnects to the wireless network when the wireless network is available.

26. The method of claim 1, further wherein no sensitive data is stored on the mobile device.

27. The method of claim 26, wherein the sensitive data comprises at least one of information related to the payment method, information related to the password user input login information, and information related to an expiration dates associated with the payment method.

28. The method of claim 1, further wherein the non-browser based application generated screen receives input to zoom into an image associated with the product which results in a more granular image with more details about the product, wherein the non-browser based application generated screen receives the input to zoom into the image associated with the product through the user input via the mobile device display of the mobile device.

29. The system of claim 10, further wherein the non-browser based application can be used when the mobile device is not connected to a wireless network.

30. The system of claim 29, further wherein the non-browser based application monitors for access to the wireless network and automatically reconnects to the wireless network when the wireless network is available.

31. The system of claim 10, further wherein no sensitive data is stored on the mobile device.

32. The system of claim 10, wherein the sensitive data comprises at least one of information related to the payment method, information related to the password, and information related to an expiration dates associated with the payment method.

33. The system of claim 10, further wherein the non-browser based application generated screen receives input to zoom into an image associated with a product from the list which results in a more granular image of the product from the list with more details about the product, wherein the non-browser based application generated screen receives the input to zoom into the image associated with the product from the list through the user input via the mobile device display of the mobile device.

34. The method of claim 1, wherein the remote management server sends the digital artifact to the non-browser based application generated screen based on the geographical location of the mobile device.

35. The method of claim 1, further wherein the graphical user interface includes a graphical icon.

36. The method of claim 1, further wherein the remote management server is configured to store a single identification code associated with the payment method for the user for a variety plurality of mobile devices, and further wherein the configuration means the remote management server scales.

37. The method of claim 1, further wherein the, non-browser based application sends a requests to the remote management server to retransmit the digital artifact if it has not received the digital artifact from the remote management server within a certain period of time.

38. The system of claim 10, wherein the remote management server sends the digital artifact to the non-browser based application generated screen based on the geographical location of the mobile device.

39. The system of claim 10, further wherein the graphical user interface includes aa graphical icon.

40. The system of claim 10, further wherein the remote management server is configured to store a single identification code associated with the payment method for the user for a plurality of mobile devices, and further wherein the configuration means the remote management server scales.

41. The system of claim 10, further wherein the, non-browser based application sends a requests to the remote management server to retransmit the digital artifact if it has not received the digital artifact from the remote management server within a certain period of time.

* * * * *